United States Patent
Baba et al.

(10) Patent No.: US 10,103,588 B2
(45) Date of Patent: Oct. 16, 2018

(54) PERMANENT MAGNET-EMBEDDED ELECTRIC MOTOR, COMPRESSOR, AND REFRIGERATING AND AIR-CONDITIONING DEVICE

(71) Applicant: Mitsubishi Electric Corporation, Tokyo (JP)

(72) Inventors: Kazuhiko Baba, Tokyo (JP); Masahiro Nigo, Tokyo (JP); Kazuchika Tsuchida, Tokyo (JP); Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/033,923

(22) PCT Filed: Dec. 5, 2013

(86) PCT No.: PCT/JP2013/082730
§ 371 (c)(1),
(2) Date: May 3, 2016

(87) PCT Pub. No.: WO2015/083274
PCT Pub. Date: Jun. 11, 2015

(65) Prior Publication Data
US 2016/0276886 A1 Sep. 22, 2016

(51) Int. Cl.
*H02K 1/27* (2006.01)
*F25B 1/00* (2006.01)
(Continued)

(52) U.S. Cl.
CPC ............ *H02K 1/276* (2013.01); *F25B 1/005* (2013.01); *F25B 31/026* (2013.01); *H02K 5/225* (2013.01);
(Continued)

(58) Field of Classification Search
CPC .. H02K 1/22; H02K 1/24; H02K 1/27; H02K 1/276; H02K 1/2766; H02K 1/28;
(Continued)

(56) References Cited

U.S. PATENT DOCUMENTS

| | | | |
|---|---|---|---|
| 4,110,718 A * | 8/1978 | Odor | H01F 1/10 310/154.26 |
| 6,340,857 B2 * | 1/2002 | Nishiyama | H02K 1/276 310/156.21 |

(Continued)

FOREIGN PATENT DOCUMENTS

| | | |
|---|---|---|
| EP | 0 729 216 A2 | 8/1996 |
| EP | 1 971 009 A1 | 9/2008 |

(Continued)

OTHER PUBLICATIONS

Extended European Search Report dated Jul. 21, 2017 issued in corresponding EP patent application No. 13898601.3.
(Continued)

*Primary Examiner* — Tran Nguyen
(74) *Attorney, Agent, or Firm* — Posz Law Group, PLC

(57) ABSTRACT

An interior permanent magnet motor includes a stator and a rotor. The rotor includes a rotor core having a plurality of magnet receiving holes, and a plurality of permanent magnets are received in each of the magnet receiving holes. A plurality of slits are formed at a part between an outer peripheral surface of the rotor and an outer-side defining line of the each of the magnet receiving holes. At least one space portion is secured between the plurality of permanent magnets, and the space portion is opposed to any one of the plurality of slits in a direction parallel to a magnetic pole center line.

13 Claims, 9 Drawing Sheets

(51) Int. Cl.
*F25B 31/02* (2006.01)
*H02K 5/22* (2006.01)
*H02K 7/14* (2006.01)
*H02K 29/03* (2006.01)

(52) U.S. Cl.
CPC ............... *H02K 7/14* (2013.01); *H02K 29/03* (2013.01); *H02K 2213/03* (2013.01)

(58) Field of Classification Search
CPC ............ H02K 5/22; H02K 5/225; H02K 7/14; H02K 15/02; H02K 15/03; H02K 21/12; H02K 21/14; H02K 21/16
See application file for complete search history.

(56) References Cited

U.S. PATENT DOCUMENTS

| | | | |
|---|---|---|---|
| 6,359,359 B1* | 3/2002 | Miura | H02K 1/276 310/156.08 |
| 2007/0126304 A1 | 6/2007 | Ito et al. | |
| 2008/0224558 A1* | 9/2008 | Ionel | H02K 1/276 310/156.57 |
| 2009/0278416 A1 | 11/2009 | Ida et al. | |

FOREIGN PATENT DOCUMENTS

| | | | |
|---|---|---|---|
| JP | 2005-245148 A | 9/2005 |
| JP | 2007-174776 A | 7/2007 |
| JP | 2008-022601 A | 1/2008 |
| JP | 2010-206882 A | 9/2010 |
| JP | 2011-078283 A | 4/2011 |
| JP | 2012-050331 A | 3/2012 |
| JP | 2012-105410 A | 5/2012 |
| WO | 2008/113082 A1 | 9/2008 |
| WO | 2013/069076 A1 | 5/2013 |

OTHER PUBLICATIONS

International Search Report of the International Searching Authority dated Mar. 11, 2014 for the corresponding International application No. PCT/JP2013/082730 (and English translation).
EP Communication dated Mar. 27, 2018 issued in corresponding EP patent application No. 13898601.3.

* cited by examiner

PERMANENT MAGNET-EMBEDDED ELECTRIC MOTOR, COMPRESSOR, AND REFRIGERATING AND AIR-CONDITIONING DEVICE

CROSS REFERENCE TO RELATED APPLICATION

This application is a U.S. national stage application of PCT/JP2013/082730 filed on Dec. 5, 2013, the contents of which are incorporated herein by reference.

TECHNICAL FIELD

The present invention relates to an interior permanent magnet motor, a compressor, and a refrigeration and air conditioning apparatus.

BACKGROUND ART

For example, an interior permanent magnet motor having a plurality of permanent magnets embedded in a rotor core is used as a motor for a compressor to be used in a refrigeration apparatus or an air conditioning apparatus. The plurality of permanent magnets are each inserted into a corresponding magnet receiving hole formed in the rotor core.

In such a motor for a compressor, a lubricating oil in an airtight container of the compressor enters each of the magnet receiving holes so that the permanent magnets may easily be moved. Further, as a direct factor, an electromagnetic force from a stator acts on each of the permanent magnets so that the permanent magnets may be moved inside the magnet receiving holes. As a result, vibration and noise may be generated due to such movement of the permanent magnets.

In view of this, in a motor disclosed in Patent Literature 1, a pair of permanent magnets separated from each other are inserted into each of the magnet receiving holes of the rotor core. In the motor, due to the electromagnetic force from the stator, the pair of permanent magnets are pulled inside the corresponding magnet receiving hole in directions away from each other. Therefore, it is intended that, even when the lubricating oil enters each of the magnet receiving holes during an operation of the compressor so that the permanent magnets may easily be moved, each of the permanent magnets is not moved inside a slot in a reciprocating manner to suppress the above-mentioned vibration and noise.

CITATION LIST

Patent Literature

[PTL 1] JP 2007-174776 A

SUMMARY OF INVENTION

Technical Problem

In this case, in the interior permanent magnet motor, the magnetic resistance at a radially outer portion of the magnet receiving hole is small, and hence a magnetic flux in a direction of a so-called q-axis (axis extending between the adjacent magnets and forming an electrical angle of 90 deg. with respect to a d-axis (center axis of the permanent magnet)) easily flows. As a result, an exciting force in a radial direction of the rotor may act on each of the permanent magnets, and there is also a fear in that vibration and noise are generated. Further, in this regard, Patent Literature 1 deals with a problem of vibration of the permanent magnets in a circumferential direction, but does not disclose the subject regarding the exciting force in the radial direction.

The present invention has been made in view of the above, and has an object to provide an interior permanent magnet motor capable of reducing an exciting force in a radial direction, which acts on each of permanent magnets.

Solution to Problem

In order to achieve the object described above, according to one embodiment of the present invention, there is provided an interior permanent magnet motor, including: a stator; and a rotor rotatably arranged so as to be opposed to the stator, in which the rotor includes a rotor core having a plurality of magnet receiving holes, in which a plurality of permanent magnets are received in each of the magnet receiving holes, in which a plurality of slits are formed in the rotor core at a part between an outer peripheral surface of the rotor and an outer-side defining line of the each of the magnet receiving holes, in which at least one space portion is formed between the plurality of permanent magnets in a state of being inserted into the each of the magnet receiving holes, and in which the space portion is opposed to any one of the plurality of slits in a direction parallel to a magnetic pole center line. Assuming that a circumferential width of the space portion is represented by W1, and a circumferential width of the slit located at a position opposed to the space portion is represented by W2, a relationship of W1≤W2 may be satisfied.

Two of the permanent magnets may be inserted into the each of the magnet receiving holes, and the two of the permanent magnets may have the same size.

Alternatively, three of the permanent magnets or four or more of the permanent magnets may be inserted into the each of the magnet receiving holes, and a circumferential width of each of the permanent magnets arranged on both end sides may be smaller than a circumferential width of one of the permanent magnets other than the permanent magnets arranged on both the end sides or a circumferential width of each of two or more of the permanent magnets other than the permanent magnets arranged on both the end sides.

In this case, coercivity of the each of the permanent magnets arranged on both the end sides may be larger than coercivity of the one of the permanent magnets other than the permanent magnets arranged on both the end sides or coercivity of the each of the two or more of the permanent magnets other than the permanent magnets arranged on both the end sides.

Further, in order to achieve the same object, according to one embodiment of the present invention, there is provided a compressor, including, in an airtight container: a motor; and a compression element. The motor is the above-mentioned interior permanent magnet motor of the one embodiment of the present invention.

Further, in order to achieve the same object, according to one embodiment of the present invention, there is provided a refrigeration and air conditioning apparatus, including the above-mentioned compressor of the one embodiment of the present invention as a component of a refrigeration cycle.

Advantageous Effects of Invention

According to the one embodiment of the present invention, it is possible to reduce the exciting force in the radial direction, which acts on each of the permanent magnets.

DESCRIPTION OF EMBODIMENTS

Figure 1:
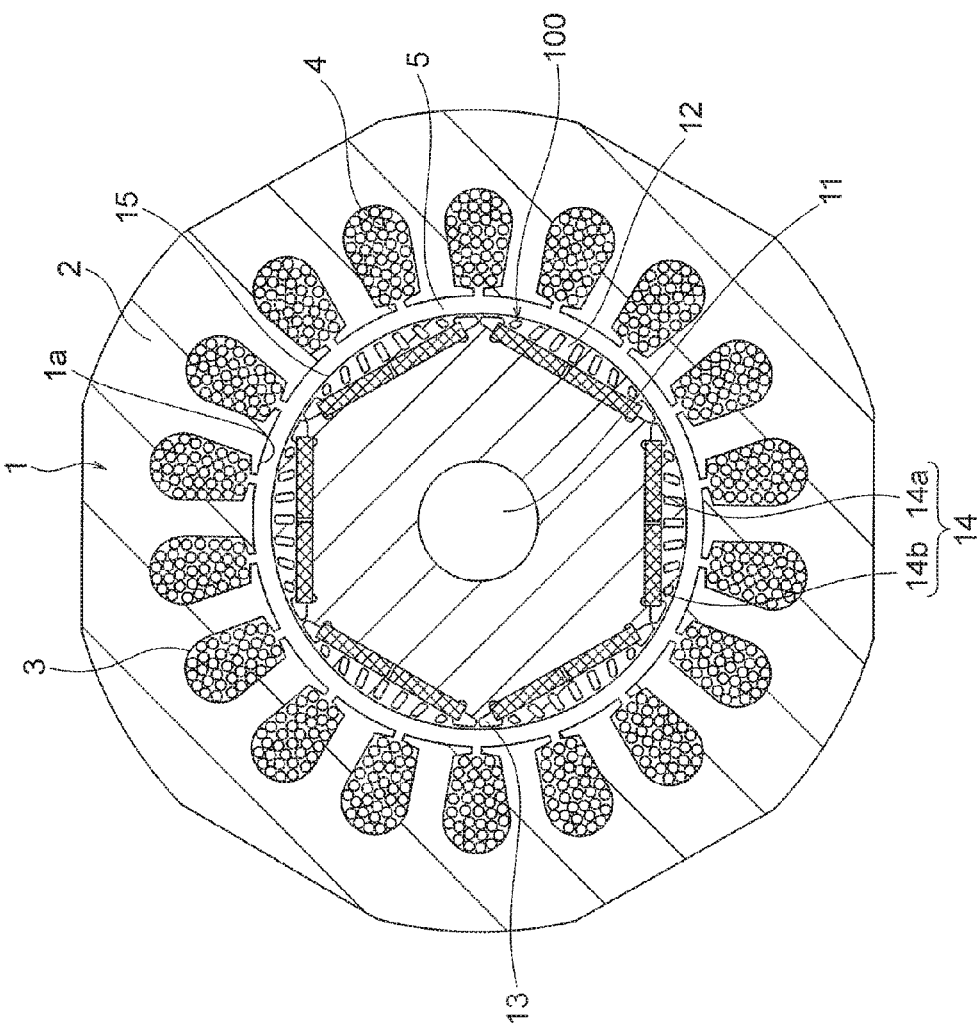
FIG. 1 is a sectional view for illustrating an interior permanent magnet motor according to a first embodiment of the present invention whose cross section is perpendicular to a rotation center line.

Now, embodiments of the present invention are described referring to the accompanying drawings. Note that, in the drawings, the same reference symbols represent the same or corresponding parts. Note that, FIG. 2 to FIG. 7 are all partially enlarged views extracting a part from a corresponding entire configuration in the illustration of FIG. 1, and for the sake of clarity of illustration, the hatching is omitted.

First Embodiment

Figure 2:
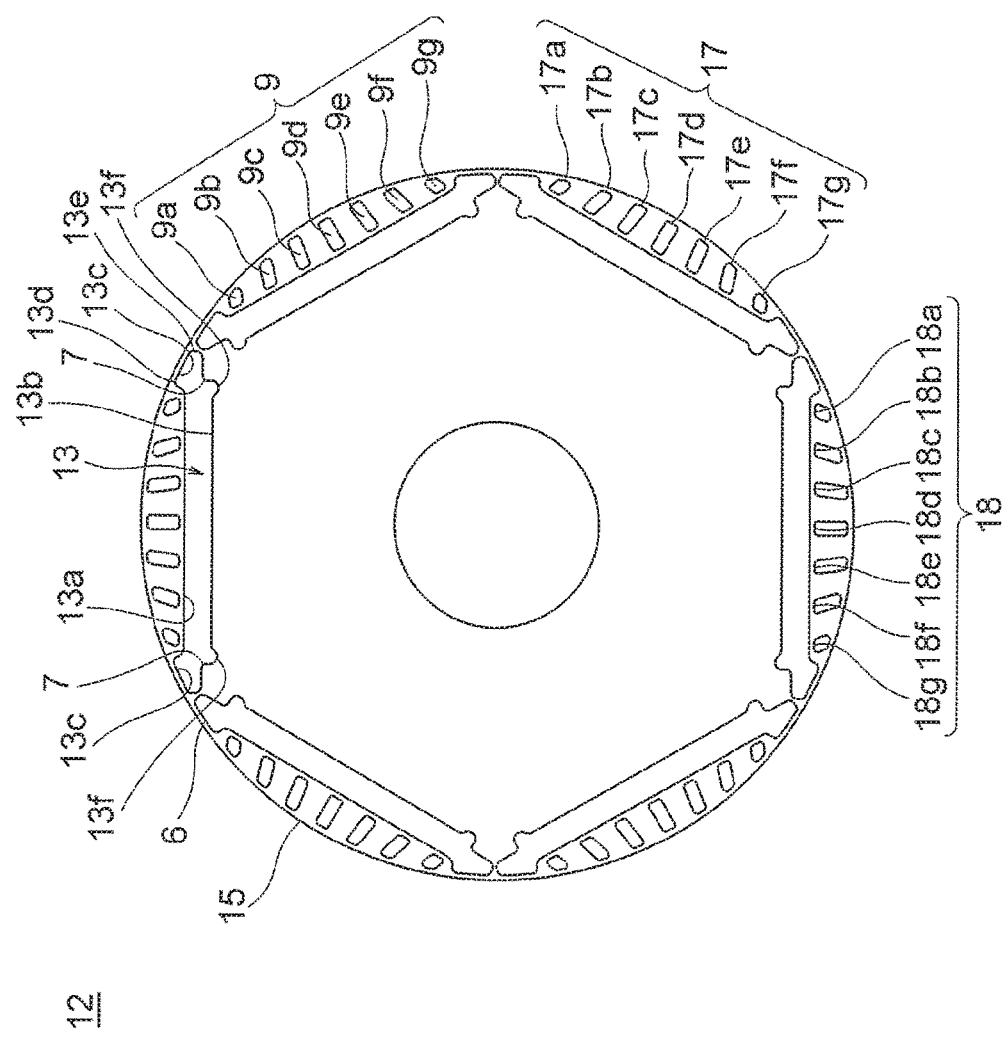
FIG. 2 is a view for illustrating a rotor alone in FIG. 1 in an enlarged manner.
Figure 3:
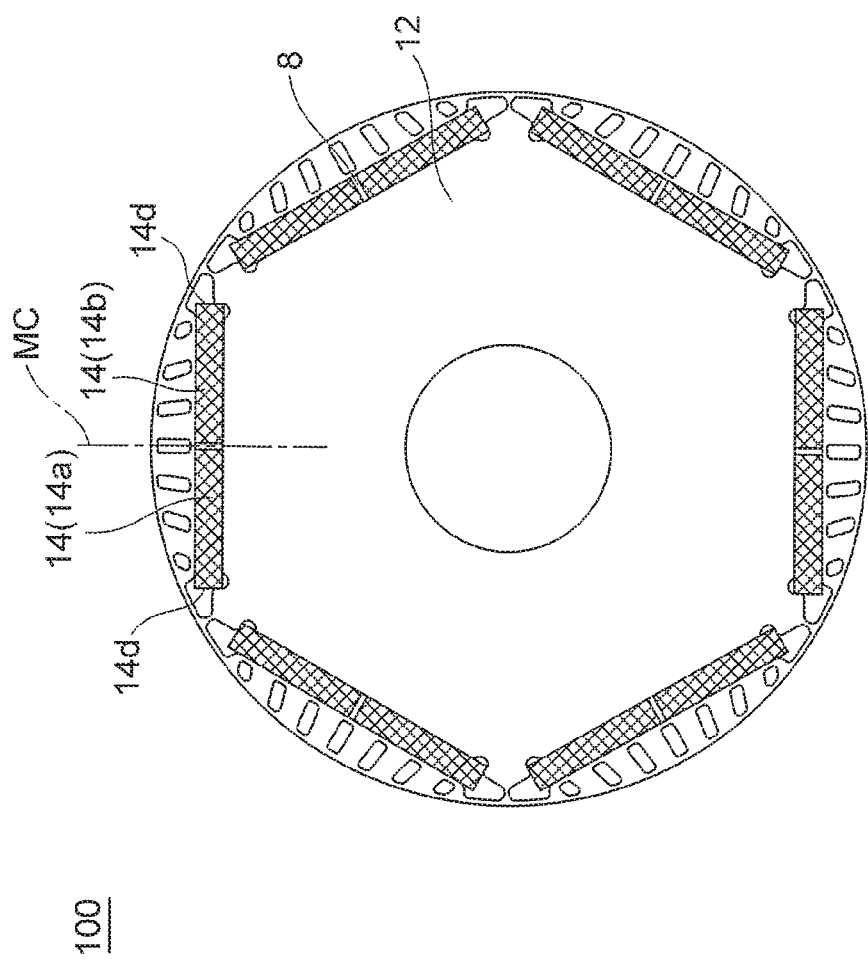
FIG. 3 is a sectional view for illustrating a state in which permanent magnets are not set in magnet receiving holes in FIG. 2.

FIG. 1 is a sectional view for illustrating an interior permanent magnet motor according to a first embodiment of the present invention whose cross section is perpendicular to a rotation center line. FIG. 2 is a view for illustrating a rotor alone in FIG. 1 in an enlarged manner. FIG. 3 is a sectional view for illustrating a state in which permanent magnets are not set in magnet receiving holes in FIG. 2.

In FIG. 1, an interior permanent magnet motor 50 according to the first embodiment includes an annular stator 1 and a rotor 100. The stator 1 includes an annular stator core 2, a plurality of slots 3 formed in a part of the stator core 2 on an inner peripheral side thereof at equiangular pitches in a circumferential direction (direction of a circumference of a circle centered at a rotation center line of the rotor in a plane perpendicular to the rotation center line, namely, direction of a rotation locus of the rotor 100), and coils 4 received in the respective slots 3. The stator 1 illustrated in FIG. 1 is a distributed winding stator as an example, but a concentrated winding stator may be employed instead.

The rotor 100 is rotatably arranged in an annular inner space of the stator 1. A cylindrical air gap 5 is formed between an outer peripheral surface 15 of the rotor 100 (rotor core 12) and an inner peripheral surface 1a of the stator 1.

On the other hand, the rotor 100 includes, as main components thereof, a rotary shaft 11, the rotor core 12, and a plurality of permanent magnets 14. Rotational energy from a drive source is transmitted to the rotary shaft 11. With the rotational energy, the rotor core 12 arranged around the rotary shaft 11 is rotated. The rotor core 12 and the rotary shaft 11 are coupled to each other by, for example, shrink fitting or press fitting.

Further, details of the rotor are described. FIG. 2 is an illustration of the rotor core 12 before the permanent magnets 14 are received. The rotor core 12 is manufactured by laminating a plurality of silicon steel sheets (constructing sheets), which are each punched into a predetermined shape with a die, in an extending direction of the rotary shaft 11 (front-back direction of the drawing sheet of FIG. 2). The outer peripheral surface 15 of the rotor core 12 is formed into a cylindrical shape.

Six magnet receiving holes 13 arrayed along the circumferential direction are formed in the rotor core 12. That is, the first embodiment exemplifies the interior permanent magnet motor of six poles. However, it is not intended to limit the number of poles of the interior permanent magnet motor according to the present invention.

The six magnet receiving holes 13 have the same shape. Further, the six magnet receiving holes 13 are each spread in an equiangular range. Moreover, positions of respective portions of the magnet receiving holes 13 in a radial direction are also the same among the six magnet receiving holes 13.

The magnet receiving holes 13 each have an outer-side defining line 13a, an inner-side defining line 13b, and a pair of end lines 13c. The outer-side defining line 13a and the inner-side defining line 13b respectively indicate an inner side and an outer side in the radial direction (direction of a radius of the circle centered at the rotation center line of the rotor in the plane perpendicular to the rotation center line).

The pair of end lines 13c each connect together an end portion 13d of the outer-side defining line 13a and an end portion 13e of the inner-side defining line 13b in the vicinity of the outer peripheral surface 15 of the rotor core 12. Most part of each of the outer-side defining line 13a and the inner-side defining line 13b (other than the end portions) extends in a direction orthogonal to the radial direction. The end lines 13c are each located extremely closer to the outer peripheral surface 15 of the rotor core 12 than the outer-side defining line 13a, and a so-called flux barrier is formed in a portion on the radially inner side with respect to each of the end lines 13c.

The rotor core 12 has thin outer peripheral core portions 6 each formed between the outer peripheral surface 15 of the rotor core 12 and each of the end lines 13c of each of the magnet receiving holes 13.

The rotor core 12 is constructed as described above, thereby being capable of increasing the magnetic resistance in the vicinity of each of both end portions (end lines 13c) of each of the magnet receiving holes 13. With this, a short-circuit magnetic flux of each of the magnets can be reduced to realize higher torque.

Further, a pair of protruding portions 7 are formed on both ends of the inner-side defining line 13b of each of the magnet receiving holes 13. The pair of protruding portions 7 protrude toward the radially outer side. Those protruding portions 7 have a function for positioning to prevent displacement of each of the permanent magnets 14 in the circumferential direction.

As a height of each of the protruding portions 7, there is secured a dimension that allows surface contact between an end surface 14d of the permanent magnet 14 on an inter-pole side in a longitudinal direction of the permanent magnet 14 and a side surface of the protruding portion 7 when the permanent magnet 14 is inserted. At the surface contact portion, a dimension that allows prevention of the displacement of the permanent magnet 14 in a lower limit of a dimensional tolerance of the permanent magnet 14 only needs to be secured. In this embodiment, the dimension of the surface contact portion is about 0.5 mm.

Further, the inner-side defining line 13b of each of the magnet receiving holes 13 has a pair of recesses 13f, which are recessed toward the inner side in the radial direction, at portions on a magnetic pole center side in the circumferential direction with respect to the pair of protruding portions 7.

A plurality of (seven) slits 9 (9a to 9g) are formed in the rotor core 12 at a core part between the outer-side defining line 13a of each of the magnet receiving holes 13 and the outer peripheral surface 15. The slits 9 (9a to 9g) each have a shape closed in the rotor core 12 without an opening portion leading to the magnet receiving hole 13 or the outer peripheral surface 15. Further, the plurality of slits 9 extend in a substantially radial direction for each magnetic pole. A length extending in the substantially radial direction is largest at the slit 9d formed at a magnetic pole center portion, is reduced as approaching to inter-pole portions, and is smallest at the slits 9a and 9g formed at the inter-pole portions.

Thin outer core portions 17 (17a to 17g) are each formed in the rotor core 12 at a portion between each of the plurality of slits 9 and the outer peripheral surface 15.

Further, thin inner core portions 18 (18a to 18g) are each formed in the rotor core 12 at a portion between each of the plurality of slits 9 (9a to 9g) and the outer-side defining line 13a of the magnet receiving hole 13, which is arranged so as to be opposed to the slits 9 (9a to 9g).

A thickness of each of the plurality of outer core portions 17 and the plurality of inner core portions 18 is set as large as a thickness of the magnetic steel plate, and is, for example, about 0.2 mm to about 0.5 mm.

Figure 4:
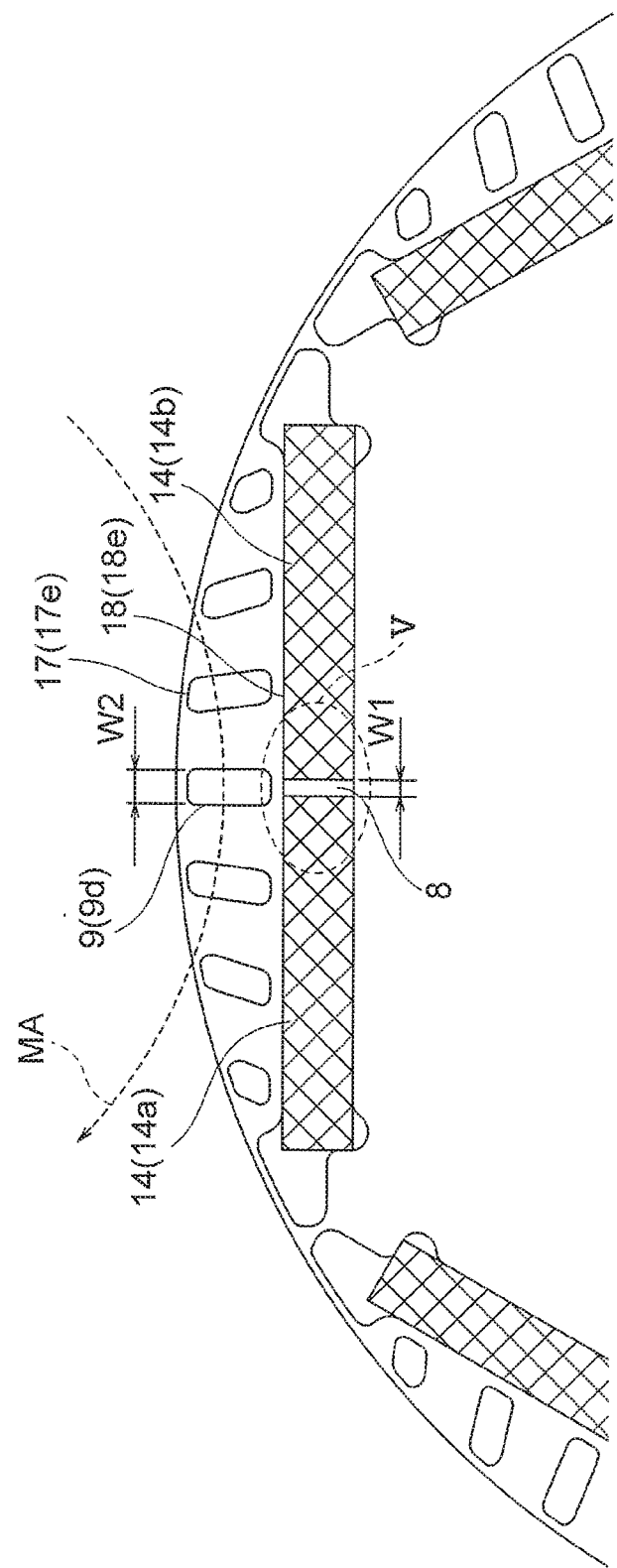
FIG. 4 is a view for illustrating a peripheral part of the magnet receiving hole for one pole in FIG. 2 in an enlarged manner.
Figure 5:
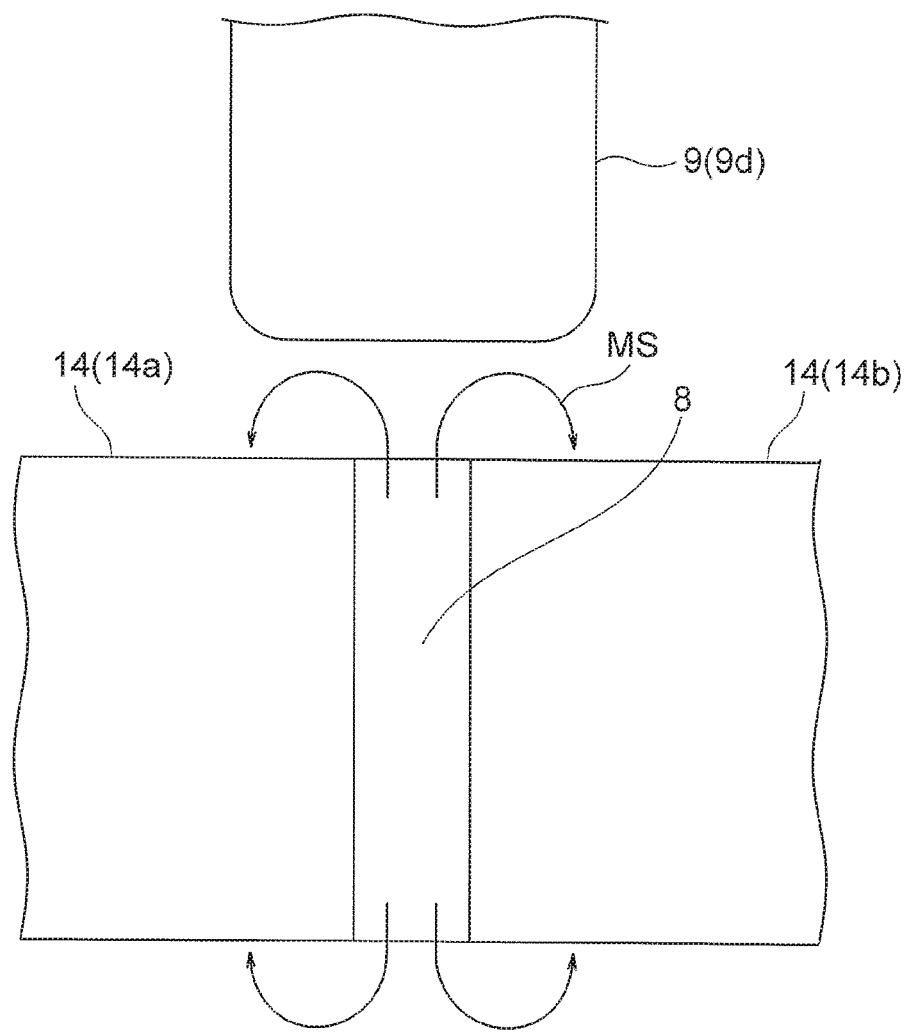
FIG. 5 is a view for illustrating the part V of FIG. 4 in an enlarged manner.

As illustrated in FIG. 3, in each of the magnet receiving holes 13, two permanent magnets 14 (14a and 14b) for one pole, each having a flat plate shape (shape having a rectangular cross section in cross section of FIG. 3 and the like), are received to be arrayed in the circumferential direction. Now, also referring to FIG. 4 and FIG. 5, more detailed description is given. FIG. 4 is a view for illustrating a peripheral part of the magnet receiving hole for one pole in FIG. 2 in an enlarged manner, and FIG. 5 is a view for illustrating the part V of FIG. 4 in an enlarged manner.

In the first embodiment, the permanent magnets 14 are arranged twice as many as the number of poles in the circumferential direction of the rotor core 12. Further, the two permanent magnets 14 arranged in the same magnet receiving hole have polarities in the same direction. Moreover, a pair of the permanent magnets 14 respectively received in the adjacent magnet receiving holes 13 are arranged to have polarity directions opposite to each other so that the pair of the permanent magnets 14 have polarities different from each other.

The permanent magnets 14 are Nd—Fe—B based rare-earth magnets, and are magnetized so that N poles and S poles are alternately located every two magnets in the circumferential direction as described above.

Further, the two permanent magnets 14 inserted into the corresponding magnet receiving hole 13 have the same size.

In each of the magnet receiving holes 13, a space portion 8 is secured between the two permanent magnets 14 in a state of being inserted into the corresponding magnet receiving hole 13. The space portion 8 is opposed to any one of the slits 9 in a direction parallel to a magnetic pole center line MC (see FIG. 3). In particular, in the example of the figures in the first embodiment, the two permanent magnets 14 having the same shape are arranged in each of the magnet receiving holes 13, and the space portion 8 is located on the magnetic pole center line. On the other hand, one slit 9d of the plurality of slits 9 is located on the magnetic pole center line, and the other slits are formed to be line symmetric across the magnetic pole center line. Thus, in the example of the figures in the first embodiment, the space portion 8 is opposed to the slit 9d in the direction parallel to the magnetic pole center line. More specifically, both the space portion 8 and the slit 9d are located on the magnetic pole center line. However, the first embodiment is not limited thereto. It is only necessary that the space portion 8 be opposed to anyone of the slits 9 in the direction parallel to the magnetic pole center line, and both the space portion and the slit opposed to each other are not limited to be located on the magnetic pole center line itself.

Further, an example of a relationship between a width of the space portion and a width of the slit is described. As illustrated in FIG. 4, assuming that a circumferential width (width in a direction orthogonal to the magnetic pole center line) of the space portion 8 between the two permanent magnets 14 (14a and 14b) is represented by W1, and a circumferential width of the slit 9d at the center portion, which is formed at the position opposed to the space portion 8, is represented by W2, the circumferential widths are set so as to satisfy a relationship of W1≤W2.

In the interior permanent magnet motor according to the first embodiment, which is constructed as described above, the following excellent advantages are obtained. First, the plurality of slits are formed in the rotor core, thereby being capable of suppressing a flow of a stator reaction magnetic flux MA from the stator, which propagates in the substantially circumferential direction and may cause noise and vibration. With this, noise and vibration during an operation of the interior permanent magnet motor can be suppressed. Further, the two permanent magnets are inserted into each of the magnet receiving holes, and the space portion is secured between those permanent magnets. Thus, as illustrated in FIG. 5, a short-circuit magnetic flux MS is increased between end portions of the permanent magnets, which face each other across the space portion, thereby increasing a magnetic flux density of the rotor core at each of portions between the plurality of slits and the plurality of permanent magnets. With this, the flow of the stator reaction magnetic flux MA from the stator, which propagates in the substantially circumferential direction, can be suppressed, thereby obtaining an advantage in that an exciting force in the radial direction can be reduced.

Further, assuming that the circumferential width of the space portion is represented by W1, and the circumferential width of the slit, which is located at the position opposed to the space portion, is represented by W2, the interior permanent magnet motor is constructed so as to satisfy the relationship of W1≤W2. Therefore, the magnetic flux density at each of the portions between the plurality of slits and the plurality of permanent magnets can be increased while suppressing reduction of the magnetic fluxes of the permanent magnets. Further, the two permanent magnets are inserted into the corresponding magnet receiving hole, and those permanent magnets have the same size. Therefore, the above-mentioned advantages can be obtained while reducing cost required for the permanent magnets to be set at many positions.

Second Embodiment

Figure 6:
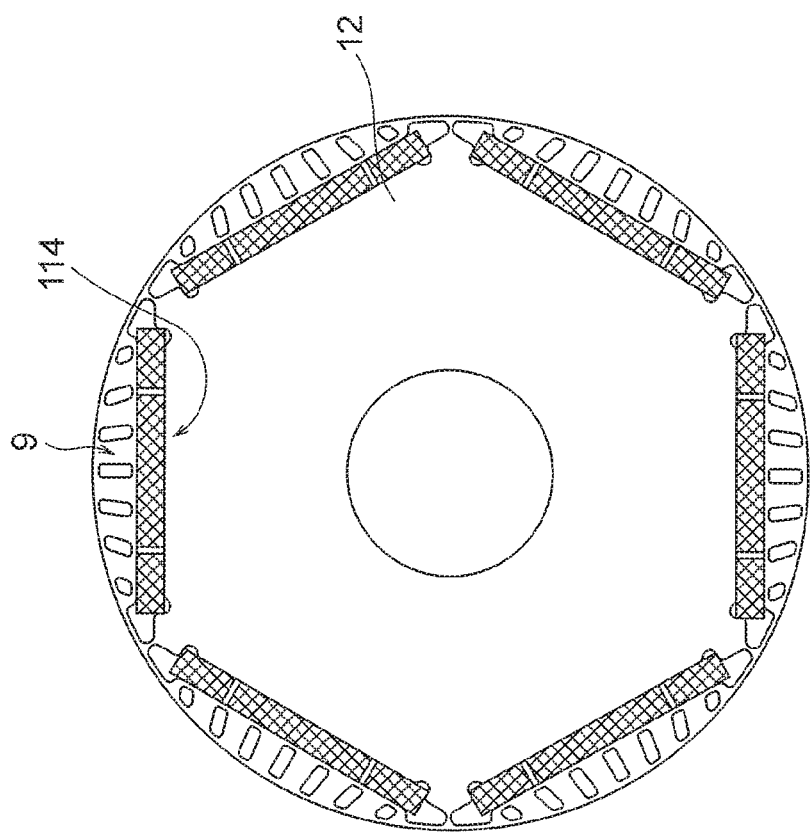
FIG. 6 is a view according to a second embodiment of the present invention in the same manner as that of FIG. 3.
Figure 7:
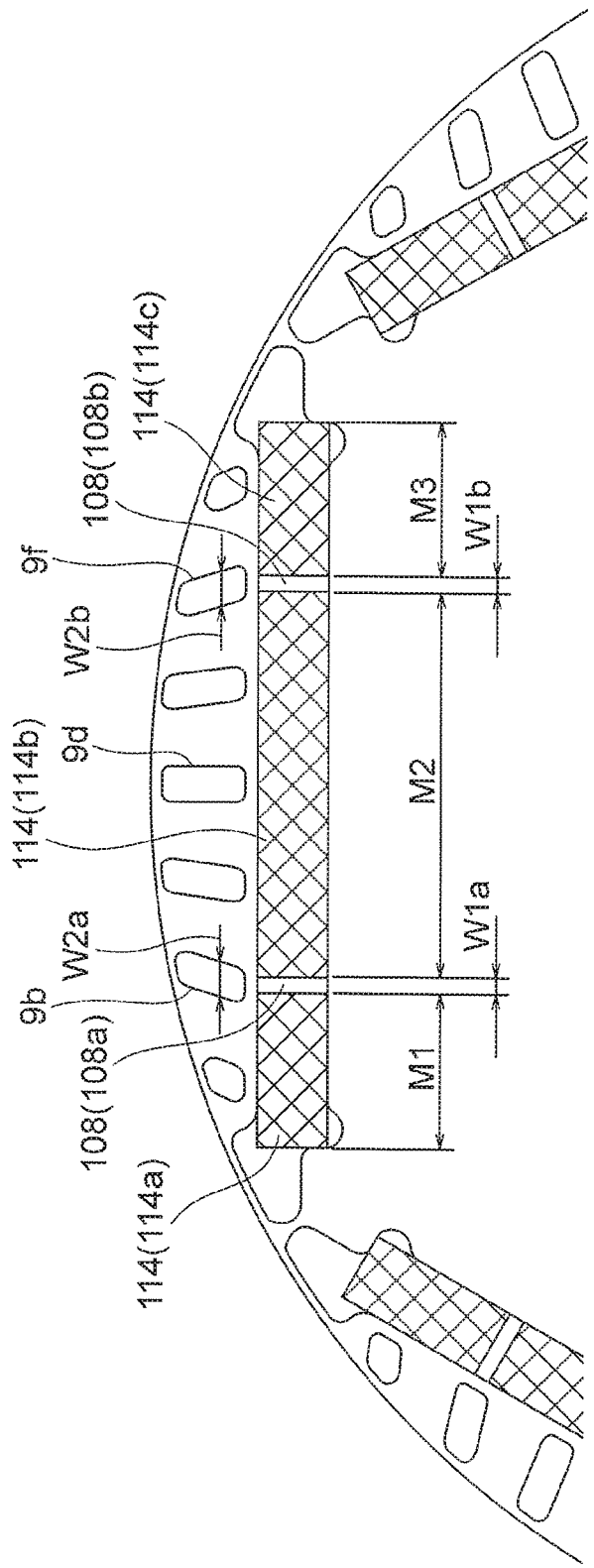
FIG. 7 is a view according to the second embodiment in the same manner as that of FIG. 4.

Next, an interior permanent magnet motor according to a second embodiment of the present invention is described. FIG. 6 and FIG. 7 are views according to the second embodiment of the present invention in the same manner as those of FIG. 3 and FIG. 4, respectively. Note that, the second embodiment has the same configuration as that of the above-mentioned first embodiment except for portions described below.

In the rotor according to the above-mentioned first embodiment, the two magnets are arranged for one pole. On the other hand, in a rotor 200 according to the second embodiment, three permanent magnets 114 (114a, 114b, and 114c) are arranged for one pole. Similarly to the first embodiment, space portions 108 (108a and 108b) are secured respectively between the adjacent permanent magnets 114 at positions opposed to the slits. Further, similarly, as a specific example of the second embodiment, a circumferential width of each of the space portions 108 between the adjacent permanent magnets 114 is smaller than a circumferential width of each of the corresponding slits 109 opposed to the space portions 108. More specific description is given. Assuming that a circumferential width of the space portion 108a between the two permanent magnets 114a and 114b is represented by W1a, a circumferential width of the space portion 108b between the other two permanent magnets 114b and 114c is represented by W1b, a circumferential width of the slit 9b formed at the position opposed to the space portion 108a is represented by W2a, and a circumferential width of the slit 9f formed at the position opposed to the other one space portion 108b is represented by W2b, relationships of W1a≤W2a and W1b≤W2b are satisfied. Note that, in particular, in this embodiment, relationships of W1a=W1b and W2a=W2b are satisfied.

Further, assuming that, in each of the magnet receiving holes 13, circumferential widths of the permanent magnets 114a and 114c, which are arranged on both end sides in the magnet receiving hole 13 in the direction orthogonal to the magnetic pole center line, are represented by M1 and M3, respectively, and a circumferential width of the permanent magnet 114b arranged at the middle is represented by M2, relationships of M1≤M2 and M3≤M2 are satisfied. Note that, in particular, in this embodiment, a relationship of M1=M3 is satisfied.

Also in the interior permanent magnet motor according to the second embodiment, which is constructed as described above, similarly to the case of the above-mentioned first embodiment, the flow of the stator reaction magnetic flux from the stator, which propagates in the substantially circumferential direction, can be suppressed to reduce the exciting force in the radial direction.

In addition, in the second embodiment, loss of the permanent magnets arranged on both the ends, which are large in eddy current loss, can be reduced effectively to suppress heat generation of the magnets and improve the demagnetization resistance. The reason for this is as follows. First, when one permanent magnet is arranged for one pole, a magnetic flux generated by a stator winding passes between the slits and flows in a direction substantially orthogonal to the longitudinal direction of the magnet (direction orthogonal to the magnetic pole center line). At this time, when the magnitude of the magnetic flux generated by the stator winding is changed, an eddy current flows in the magnet to cause loss so that the temperature increase of the magnet may become significant. Further, the eddy current flows particularly toward portions corresponding to the ends of the magnet in a concentrated manner. In view of this, in the second embodiment, the circumferential width of each of the magnets arranged on both the end sides is set smaller than the circumferential width of the other magnet. Thus, the electrical resistance of each of the magnets arranged on both the ends can be increased to reduce the eddy current. Note that, in this embodiment, the three magnets are arranged in the magnet receiving hole, and hence the other magnet corresponds to one magnet at the center. However, the second embodiment is not intended to be limited thereto, and a mode in which four or more magnets are arranged in the magnet receiving hole may be employed. In this case, the circumferential width of each of the magnets arranged on both the end sides is set smaller than the circumferential width of each of the other magnets (two or more magnets other than the magnets arranged on both the ends). That is, the circumferential width of each of the permanent magnets arranged on both the end sides is smaller than the circumferential width of the other one permanent magnet than the permanent magnets arranged on both the end sides (the other one permanent magnet than the permanent magnets arranged on both the end sides when the three magnets are arranged in the magnet receiving hole) or the circumferential width of each of the two or more permanent magnets (all the other permanent magnets than the permanent magnets arranged on both the end sides when the four or more magnets are arranged in the magnet receiving hole).

Third Embodiment

Next, an interior permanent magnet motor according to a third embodiment of the present invention is described. The third embodiment is constructed as in FIG. 6 and FIG. 7 as an example, and further, the third embodiment has the same configuration as that of the above-mentioned second embodiment except for portions described below.

In the third embodiment, three or more permanent magnets are arranged in each of the magnet receiving holes, and coercivity of each of the permanent magnets arranged on both the end sides is set larger than coercivity of the other one permanent magnet than the permanent magnets arranged on both the end sides (the other one permanent magnet than the permanent magnets arranged on both the end sides when the three magnets are arranged in the magnet receiving hole) or coercivity of each of the two or more permanent magnets (all the other permanent magnets than the permanent magnets arranged on both the end sides when the four or more magnets are arranged in the magnet receiving hole).

Also in the interior permanent magnet motor according to the third embodiment, which is constructed as described above, similarly to the case of the above-mentioned first embodiment, the flow of the stator reaction magnetic flux from the stator, which propagates in the substantially circumferential direction, can be suppressed to reduce the exciting force in the radial direction. Further, similarly to the above-mentioned second embodiment, the eddy current can be reduced. In addition, in the third embodiment, the coercivity of each of the permanent magnets arranged on both the end sides is set relatively larger in the magnet receiving hole. Thus, even when the interior permanent magnet motor is used in a high-temperature atmosphere inside a compressor, the magnets are not demagnetized. As a result, it can be expected that a high-power motor suitable for drive at highspeed and high torque be provided.

Fourth Embodiment

Next, as a fourth embodiment of the present invention, there is described a rotary compressor having the interior permanent magnet motor according to any one of the above-mentioned first to third embodiments mounted therein. Note that, the present invention encompasses a compressor having the interior permanent magnet motor according to any one of the above-mentioned first to third embodiments mounted therein. However, the type of the compressor is not limited to the rotary compressor.

Figure 8:
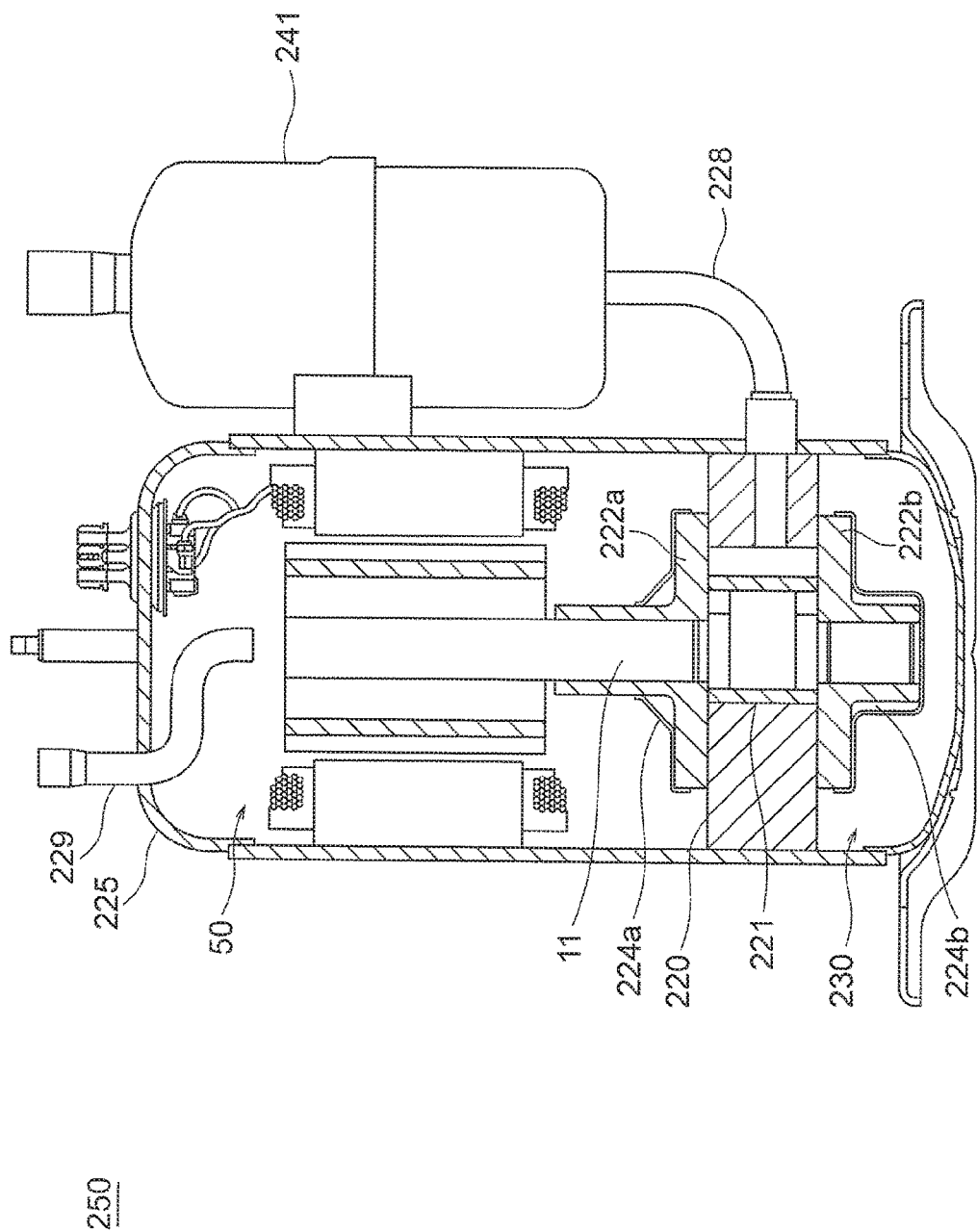
FIG. 8 is a vertical sectional view of a rotary compressor having the interior permanent magnet motor mounted therein according to a fourth embodiment of the present invention.

FIG. 8 is a vertical sectional view of the rotary compressor having the interior permanent magnet motor mounted therein. A rotary compressor 250 includes the interior permanent magnet motor 50 (motor element) and a compression element 230 in an airtight container 225. Although not illustrated, a refrigerating machine oil for lubricating each of sliding portions of the compression element 230 is stored in a bottom portion of the airtight container 225.

The compression element 230 includes, as main components thereof, a cylinder 220 arranged in a vertically stacked state, the rotary shaft 11 rotated by the motor, a piston 221 to be fitted by insertion into the rotary shaft 11, a vane (not shown) dividing an inside of the cylinder 220 into an intake side and a compression side, an upper frame 222a and a lower frame 222b being a pair of upper and lower frames into which the rotary shaft 11 is to be rotatably fitted by insertion and which are configured to close axial end surfaces of the cylinder 220, and mufflers 224a and 224b mounted on the upper frame 222a and the lower frame 222b, respectively.

The stator 1 of the interior permanent magnet motor 50 is directly fixed to the airtight container 225 by a method such as shrink fitting or welding and is held thereby. The coil 4 of the stator 1 is supplied with power from a glass terminal fixed to the airtight container 225.

The rotor 100 is arranged through intermediation of an air gap formed on the radially inner side of the stator 1, and is held in a rotatable state by the bearing portions (upper frame 222a and lower frame 222b) of the compression element 230 arranged on a lower portion of the rotary compressor 250 via the rotary shaft 11 in the center portion of the rotor 100.

Next, an operation of the rotary compressor 250 is described. A refrigerant gas supplied from an accumulator 241 is taken into the cylinder 220 through an intake pipe 228 fixed to the airtight container 25. The interior permanent magnet motor 50 is rotated by energization of an inverter so that the piston 221 fitted to the rotary shaft 11 is rotated in the cylinder 220. With this, the refrigerant is compressed in the cylinder 220. The compressed high-temperature refrigerant, which has passed through the mufflers 224a and 224b, rises in the airtight container 25 through air holes or the like of the interior permanent magnet motor 50. In this manner, the compressed refrigerant is supplied on a high-pressure side of the refrigeration cycle through a discharge pipe 229 arranged on the airtight container 225.

Note that, as the refrigerant for the rotary compressor 250, R410A, R407C, R22, or the like that has hitherto been used is used, but any refrigerant such as a refrigerant having a low global warming potential (GWP) can also be applied. In view of the prevention of global warming, a low GWP refrigerant is desirable. As typical examples of the low GWP refrigerant, the following refrigerants are given.

(1) A halogenated hydrocarbon having a carbon double bond in the composition; for example, HFO-1234yf (CF3CF=CH2) is given. An HFO is an abbreviation of a Hydro-Fluoro-Olefin, and an Olefin is an unsaturated hydrocarbon having one double bond. Note that, a GWP of HFO-1234yf is 4.

(2) A hydrocarbon having a carbon double bond in the composition; for example, R1270 (propylene) is given. Note that, R1270 has a GWP of 3, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure refrigerant, is large in pressure loss and is thus liable to degrade the performance of the refrigeration cycle (in particular, in an evaporator). Therefore, a mixture of HFO-1234yf and R32 or R41 that is a refrigerant higher in pressure than HFO-1234yf is positively used in practice.

Attention has been paid particularly on the R32 refrigerant among the above-mentioned low GWP refrigerants because the R32 refrigerant has no toxicity and is not strongly combustible. Further, when the R32 refrigerant is used in the rotary compressor 250, the R32 refrigerant exhibits a characteristic in that an internal temperature of the rotary compressor 250 is increased by about 20° C. or more as compared to the case of using R410A, R407C, R22, or the like that has hitherto been used.

The internal temperature of the rotary compressor 250 varies depending on a compression load state (rotation speed, compression load torque, and refrigerant). In a steady state in which the temperature is stabilized, the internal temperature is severely dependent particularly on the rotation speed. For example, the temperature increase inside the rotary compressor for each of the rotation speeds when the R410 refrigerant is used is as follows. The temperature is increased by amounts of from 50° C. to 60° C. in a low-speed operation, from 70° C. to 80° C. in a middle-speed operation, and from 90° C. to 110° C. in a high-speed operation, which exhibits a characteristic in that the internal temperature of the rotary compressor 250 is increased as the rotation speed of the rotary compressor 250 is increased. When the R32 refrigerant is used, the internal temperature of the rotary compressor 250 is further increased by about 20° C. from the temperature in the case of using the R410A refrigerant.

In the rotary compressor constructed as described above, the interior permanent magnet motor having a high demagnetization resistance is used, thereby attaining an effect of being capable of providing a highly reliable compressor in which the magnet is not demagnetized even when the J-coercivity is reduced due to the temperature increase of the compressor. Further, even when the interior permanent magnet motor is operated in a high-temperature atmosphere of the rotary compressor, the residual magnetic flux density of the magnet can be increased to increase torque of the motor while reducing a usage amount of Dy to be added to the rare-earth magnet to attain cost reduction, thereby being capable of providing a highly efficient compressor. Further, the motor having a small exciting force in the radial direction is used, thereby being capable of suppressing vibration and noise of the compressor.

Fifth Embodiment

Further, the present invention may be carried out as a refrigeration and air conditioning apparatus including the compressor according to the above-mentioned fourth embodiment as a component of a refrigeration cycle. Note that, configurations of components other than the compressor of the refrigeration cycle of the refrigeration and air conditioning apparatus are not particularly limited. With the use of the above-mentioned compressor in the refrigeration and air conditioning apparatus, transmission of vibration via a pipe can be suppressed to suppress vibration and noise.

Figure 9:
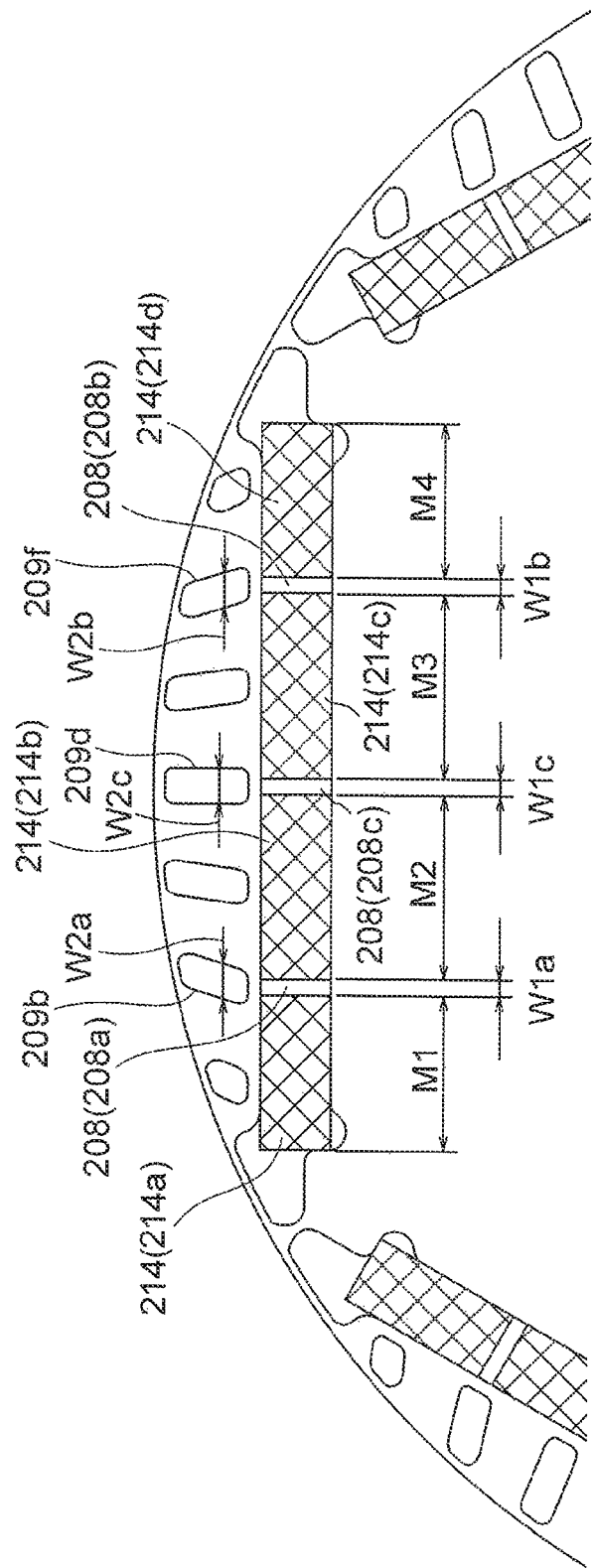
FIG. 9 is a view according to the fifth embodiment in the same manner as that of FIG. 4.

Next, an interior permanent magnet motor according to a fifth embodiment of the present invention is described. The fifth embodiment is constructed as in FIG. 9 as an example, and further, the fifth embodiment has the same configuration as that of the above-mentioned first, second, and third embodiments except for portions described below.b1

In the rotor according to the above-mentioned first embodiment, the magnets are arranged for one pole. In a rotor 200 according to the fifth embodiment, four permanent magnets 214 (214a, 214b, 214c, and 214c) are arranged for one pole. Similarly to the first through third embodiments, space portions 208 (208a, 208b, and 208c) are secured respectively between the adjacent permanent magnets 214 at positions opposed to slits 219. Further, similarly, as a specific example of the fifth embodiment, a circumferential width of each of the space portions 208 between the adjacent permanent magnets 214 is smaller than a circumferential width of each of the corresponding slits 219 opposed to the space portions 108. More specific description is given. Assuming that a circumferential width of the space portion 208a between the two permanent magnets 214a and 214b is represented by W1a, a circumferential width of the space portion 208b between the two permanent magnets 214c and 214d is represented by W1b, a circumferential width of the space portion 208c between the two permanent magnets 214b and 214c is represented by W1c, a circumferential width of the slit 209b formed at the position opposed to the space portion 208a is represented by W2a, a circumferential width of the slit 209f formed at the position opposed to the other space portion 208b is represented by W2b, a circumferential width of the slit 209d formed at the position opposed to the other one space portion 208c is represented by W2c, and relationships of W1a≤W2a, W1b≤W2b, and W1c≤W2c are satisfied. Note that, in particular, in this embodiment, relationships of W1a=W1b=W1c and W2a=W2b=W2c are satisfied.

In the above, the details of the present invention are specifically described referring to the preferred embodiments. However, it is apparent to those skilled in the art that various modifications may be made based on the basic technical concept and the teachings of the present invention.

REFERENCE SIGNS LIST 1 stator, 8, 108 space portion, 9 slit, 12 rotor core, 13 magnet receiving hole, 13a outer-side defining line, 14, 114 permanent magnet, 15 outer peripheral surface, 100, 200 rotor, 225 airtight container, 230 compression element, 250 rotary compressor

The invention claimed is:

1. An interior permanent magnet motor, comprising:
a stator; and
a rotor rotatably arranged so as to be opposed to the stator,
wherein the rotor comprises a rotor core having a plurality of straight magnet receiving holes,
wherein a plurality of permanent magnets are received in each of the straight magnet receiving holes,
wherein a plurality of slits are formed in the rotor core at a part between an outer peripheral surface of the rotor and an outer-side defining line of the each of the straight magnet receiving holes,
wherein one or more space portions are formed between the plurality of permanent magnets in a state of being inserted into the each of the straight magnet receiving holes, and
wherein the one or more space portions are opposed to any one of the plurality of slits in a direction parallel to a magnetic pole center line,
wherein each of the straight magnet receiving holes include a pair of protruding portions formed on opposite ends of an inner-side defining line of a respective straight magnet receiving hole, and
wherein each of the straight magnet receiving holes includes a pair of recesses, which are recessed toward an inner side of the rotor in the radial direction, at portions on a magnetic pole center side in a circumferential direction with respect to the pair of protruding portions.

2. The interior permanent magnet motor according to claim 1, wherein,
the plurality of permanent magnets include a first and second magnet,
the one or more space portions include a first space portion between the first and second magnets,
a circumferential width of the first space portion is represented by W1,
a circumferential width of the slit located at a position opposed to the space portion is represented by W2, and
a relationship of W1≤W2 is satisfied.

3. The interior permanent magnet motor according to claim 1,
wherein two of the permanent magnets are inserted into the each of the magnet receiving holes, and
wherein the two of the permanent magnets have the same size.

4. The interior permanent magnet motor according to claim 1,
wherein three of the plurality of permanent magnets are inserted into the each of the magnet receiving holes, and
wherein a circumferential width of each of the permanent magnets arranged on both end sides is smaller than a circumferential width of one of the three permanent magnets other than the permanent magnets arranged on both the end sides.

5. The interior permanent magnet motor according to claim 4, wherein coercivity of the each of the permanent magnets arranged on both the end sides is larger than coercivity of the one of the three permanent magnets other than the permanent magnets arranged on both the end sides.

6. The interior permanent magnet motor according to claim 1,
wherein four or more of the plurality of permanent magnets are inserted into the each of the magnet receiving holes, and
wherein a circumferential width of each of the permanent magnets arranged on both end sides is smaller than a circumferential width of each of two or more of the four or more permanent magnets other than the permanent magnets arranged on both the end sides.

7. The interior permanent magnet motor according to claim 6, wherein coercivity of the each of the permanent magnets arranged on both the end sides is larger than coercivity of the each of the two or more of the four or more permanent magnets other than the permanent magnets arranged on both the end sides.

8. A compressor, comprising, in an airtight container:
a motor; and
a compression element,
wherein the motor comprises the interior permanent magnet motor of claim 1.

9. A refrigeration and air conditioning apparatus, comprising the compressor of claim 8 as a component of a refrigeration cycle.

10. The interior permanent magnet motor according to claim 1, wherein
the plurality of permanent magnets include first, second, and third magnets,
the one or more space portions include a first space portion between the first and second magnets and a second space portion between the second and third magnets, and
the plurality of slits includes a first slit opposed to the first space portion and a second slit opposed to the second space portion.

11. The interior permanent magnet motor according to claim 10, wherein
a circumferential width of the first space portion is represented by W1$a$,
a circumferential width of the second space portion is represented by W1$b$,
a circumferential width of the first slit is represented by W2$a$,
a circumferential width of the second slit is represented by W2$b$,
a relationship of W1$a$≤W2$a$ is satisfied, and
a relationship of W1$b$≤W2$b$ is satisfied.

12. The interior permanent magnet motor according to claim 1, wherein
the plurality of permanent magnets include first, second, third, and fourth magnets,
the one or more space portions include a first space portion between the first and second magnets, a second space portion between the second and third magnets, and a third space portion between the third and fourth magnets, and
the plurality of slits includes a first slit opposed to the first space portion, a second slit opposed to the second space portion, and a third slit portion opposed to the third space portion.

13. The interior permanent magnet motor according to claim 12, wherein
a circumferential width of the first space portion is represented by W1$a$,
a circumferential width of the second space portion is represented by W1$c$,
a circumferential width of the third space portion is represented by W1$b$,
a circumferential width of the first slit is represented by W2$a$,
a circumferential width of the second slit is represented by W2$c$,
a circumferential width of the third slit is represented by W2$b$,
a relationship of W1$a$≤W2$a$ is satisfied,
a relationship of W1$b$≤W2$b$ is satisfied, and
a relationship of W1$c$≤W2$c$ is satisfied.

* * * * *